UNITED STATES PATENT OFFICE.

WILHELM ANTON CASPER HUNKEMÖLLER, OF AMSTERDAM, NETHERLANDS.

ARTIFICIAL WHALEBONE AND PROCESS OF MAKING SAME.

SPECIFICATION forming part of Letters Patent No. 676,134, dated June 11, 1901.

Application filed October 9, 1896. Serial No. 608,390. (No specimens.)

*To all whom it may concern:*

Be it known that I, WILHELM ANTON CASPER HUNKEMÖLLER, a citizen of the Kingdom of the Netherlands, and a resident of Amsterdam, in the Kingdom of the Netherlands, have invented a new and useful Artificial Whalebone and a Process of Making the Same, of which the following is a specification.

This invention relates to artificial whalebone; and the object of my invention is to produce a substance which will possess all of the desirable qualities of natural whalebone—such as elasticity, homogeneity, toughness, tensile strength, and durability—and also the appearance thereof and which will be less brittle than whalebone.

My invention consists in a new product derived from bones—namely, an artificial whalebone—and the invention also consists in a process of manufacturing such artificial whalebone from bones, which process comprises the following steps, to wit: exposing the bone to an agent that removes the calcareous matter therefrom; second, subjecting the residual organic substance or collagen to a toughening or hardening agent, whereby it is practically tanned, and, lastly, drying the toughened product and finishing the same to resemble natural whalebone.

Bones of any kind may be used in carrying out my invention.

In carrying out my process the bones are first stripped of all fleshy matter and grease, the work being done by hand or by a suitably-constructed scraping-machine, or the fleshy parts may be removed by other well-known processes in general use, as with boiling water, benzin, or sulfuret of carbon. However, I prefer the manual process, as a chemical that will dissolve such parts upon the bone is apt to damage it for after use. After they have been cleaned the bones are treated for several days with diluted hydrochloric acid of about 1,015° to 1,017° specific gravity (stronger acid acting faster, but destroying more substance) to remove the calcareous substances—mostly lime and phosphoric salts—forming part of the bone structure. The duration of this treatment corresponds with the strength of the acid employed. When the "bones" are removed from the hydrochloric or like acid, they are cleansed. At this stage of the process the bones are soft and flexible, only the cell structure of residual organic matter being retained. The bones are now tanned to give permanency to the cell structures and make them insoluble. This is done with a saturated aqueous solution of chromic salts, from which latter group I preferably select chrome-alum as the cheapest and most desirable tanning agent. The "bones," as they may still be called, remain in this solution for from three to five days until they are thoroughly tanned. The tanning process may be carried on by treating the collagenic or residual organic matter to baths of successively-stronger solutions, if desired. Various ingredients may be added to the tanning solution without departing from my invention. When the bones are removed from the tanning solution, they are tough, strong, and elastic. They are then rinsed with water and after being subjected to a superficial drying are finally dried and finished.

The finished bones are split or cut into strips corresponding in size and form to commercial whalebone. If desired, the soft bones from the chromic-acid bath may be cut into strips before being finished. This product has the color of whalebone and possesses the same qualities of strength and flexibility as natural whalebone without the tendency of the natural article to split and flake.

I regard as equivalents those metallic salts which are known to chemists to behave toward collagen as do the salts of chromium.

Having thus described my invention, I claim as new and desire to secure by Letters Patent—

1. A new article of manufacture comprising the organic residue of a bone essentially free from calcareous matter and impregnated with a tanning agent, substantially as described.

2. A new article of manufacture comprising organic bone residue substantially free from calcareous matter, impregnated with a tanning agent and dried, substantially as and for the purpose specified.

3. A new article of manufacture comprising a bone structure essentially free from calcareous matter, and impregnated with a chromic compound, substantially as and for the purpose specified.

4. A new article of manufacture, consisting of bones freed from calcareous matter by treatment with an agent, such as hydrochloric acid, afterward impregnated with chrome-alum and then dried and divided into strips, for the purpose specified.

5. The new or improved process of manufacturing artificial whalebone, which consists in impregnating the collagenous or gelatinous parts of bones with a substance having tanning reactions, substantially as and for the purpose specified.

6. The new and improved process of manufacturing artificial whalebone, which consists in impregnating the collagenous or gelatinous parts of bones with a solution of chrome-alum, substantially as and for the purpose set forth.

7. The process of making artificial whalebone from bones, that consists in eliminating the calcareous matter of the bones, then impregnating or tanning the organic residue with a tanning agent, then drying, and cutting the tanned products into strips.

8. The process of making artificial whalebone from bones, that consists in eliminating the calcareous matter of the bones, then treating the organic residue with a solution of chrome-alum and drying the resultant substance, substantially as described.

9. The process of making artificial whalebone from bones, that consists in eliminating the calcareous portions thereof by treatment with hydrochloric acid, then tanning the organic residue by treatment with a solution of chrome-alum and then drying and finishing the resultant product in pieces or strips like natural whalebone.

10. The process of manufacturing artificial whalebone, that consists in exposing the cell structures of bones, free from calcareous matter, to a tanning agent that tans said structures and then drying said structures, substantially as described.

11. The process of manufacturing artificial whalebone, that consists in tanning the non-calcareous residue of bones and drying the tanned product.

12. The process of manufacturing artificial whalebone, that consists in tanning the non-calcareous residue of bones with chrome-alum, and drying the tanned product.

In testimony that I claim the foregoing as my invention I have signed my name in the presence of two subscribing witnesses.

WILHELM ANTON CASPER HUNKEMÖLLER.

Witnesses:
BERNARDAS JOANNES MEDDEAT,
AUGUST SIEGFRIED DOCER.